United States Patent [19]

Romoser

[11] 3,716,790

[45] Feb. 13, 1973

[54] SINGLE SIDEBAND SYSTEM UTILIZING TWO TONE MODULATION

[75] Inventor: Paul E. Romoser, Lorain, Ohio

[73] Assignee: Lorain Electronics Corporation

[22] Filed: May 11, 1970

[21] Appl. No.: 36,358

[52] U.S. Cl. ......................325/49, 179/41 A, 325/55, 340/171

[51] Int. Cl. ..............................................H04b 1/68

[58] Field of Search.......179/15 FS, 41 A, 2 DP, 2 A, 179/15 BP; 325/55, 470, 50, 31, 49, 137, 138, 64

[56] References Cited

UNITED STATES PATENTS

| | | | |
|---|---|---|---|
| 3,320,535 | 5/1967 | Broadhead | 325/49 |
| 3,378,817 | 4/1968 | Vitt | 325/55 |
| 3,470,481 | 9/1969 | Myers | 325/470 |
| 3,376,509 | 4/1968 | Willcox | 179/2 DP |
| 2,801,332 | 7/1957 | Vos | 325/417 |
| 2,629,092 | 2/1953 | Herrick | 179/41 A |
| 3,513,399 | 5/1970 | Wycoff | 325/55 |
| 3,497,813 | 2/1970 | Gallagher | 325/31 |

*Primary Examiner*—Kathleen H. Claffy
*Assistant Examiner*—Thomas D'Amico
*Attorney*—Woodling, Krost, Granger and Rust

[57] ABSTRACT

Selective calling of any one of a plurality of receivers is provided in a single sideband system with calling on any one of a plurality of radio-telephone carrier channels. A first audio tone plus a sequence of five additional audio tones modulate the carrier and the carrier and one sideband is fully suppressed before transmission. In the receiver demodulation takes place to produce an output audio tone dependent upon the difference of the first audio tone and any one of the other five audio tones. The demodulated signal is thus a sequence of five audio tones which are sent through a decoding device which does not give a signal if the code is incorrect or if the length of time between tones is not correct. If both of these are correct, then a calling signal is audibly or visibly displayed at the receiver station. The foregoing abstract is merely a resume of one general application, is not a complete discussion of all principles of operation or applications, and is not to be construed as a limitation on the scope of the claimed subject matter.

17 Claims, 5 Drawing Figures

INVENTOR.
PAUL E. ROMOSER
BY Woodling, Krost, Granger and Rust
ATTORNEYS.

INVENTOR.
PAUL E. ROMOSER
BY Woodling, Krost, Granger and Rust
ATTORNEYS.

INVENTOR.
PAUL E. ROMOSER
BY Woodling, Krost, Granger and Rust
ATTORNEYS.

INVENTOR.
PAUL E. ROMOSER
BY Woodling, Krost, Granger and Rust
ATTORNEYS.

INVENTOR.
PAUL E. ROMOSER
BY Woodling, Krost, Granger and Rust
ATTORNEYS.

SINGLE SIDEBAND SYSTEM UTILIZING TWO TONE MODULATION

BACKGROUND OF THE INVENTION

In many cases of communication systems it is desired to selectively call a particular receiving station. One example of this is ship-to-shore radio-telephone communication wherein a plurality of shore stations, for example, 12 or 15 may want to selectively call any one of number of ships, for example, up to one hundred ore boats on the Great Lakes. The Government agencies restrict the number of possible channels in view of the over-crowding of the radio spectrum and recently the frequency bands available for such ship-to-shore communication have become seriously over-crowded so that the formerly used double sideband transmission has been changed to single sideband transmission with not even a vestigial carrier, instead it is a fully suppressed carrier in order to reduce the band width to half that formerly used. Only a limited number of channels may be available in such a communications system, and for example, only six channels are available for normal ship-to-shore communication on the Great Lakes. A seventh channel may be reserved for a distress signal and the ore boats would normally have only one receiver in the pilot house and this would be tuned to this distress frequency. It would not be feasible to have six different receivers each tuned to a different one of the six possible channels on which communication from the shore station might possibly be received. Also it would not be practicable to have seven loud speakers, six for the normal communication channels and one for the distress frequency, all squawking at once in the pilot house disgorging nothing but irrelevant communications with other ore boats.

The previously used VHF channels have several systems of selective calling of the wanted ship receiver based on alternating between two tones, or on switching a tone on and off, to transmit bits and, grouping the bits, to form digits in a code. In such previous systems there were searching circuits to continuously sweep through the various communication channels to continuously search such channels. However, this was a simple sequential switching of different crystals to select the proper crystal control frequencies, and no changing of tuned circuits was required. This worked well for VHF transmission but is not feasible for AM or single sideband systems.

If only a single sideband is transmitted then as this is demodulated, one obtains nothing whatever because there is no modulation nor intelligence on this single sideband. The prior art method of receiving this single sideband was to reinsert the carrier at the receiver by means of a local oscillator. This could be done with a crystal controlled oscillator and as long as the frequency was within 50 Hz. of the original carrier suppressed at the transmitter, the speech as demodulated was intelligible. If it was within 10 to 20 Hz. of the carrier frequency, the speech sounded quite natural.

However, when one is transmitting in the 2 to 23 MHz range, it would require an accuracy of one part in 100,000 at 2 MHz to have a crystal controlled oscillator which will maintain frequency within 20 Hz., and would require an accuracy of one part in 500,000 at 10 MHz. This accuracy is required and obtained with equipment of the present invention.

Notwithstanding the problems of reliable communications, the problem of transmitting some kind of code signal such as an audio tone or a sequence of such audio tones and to have these tones at particular frequencies so that they could be correctly demodulated and remain at the particular audio frequency in order to pass through a selective filter, is also not possible with the prior art systems. Take for example an audio tone of 400 Hz, even if the reinserted carrier could be maintained within plus or minus 20 Hz, this would mean that the 400 Hz tone would vary from 380 to 420 Hz. With selective filters of the vibrating reed type accurate to plus or minus 1 Hz, this is obviously too great a frequency change in the audio tone to permit accurate decoding of this sequence of audio tone signals.

Accordingly, the advantages of the present invention include a single sideband system which eliminates the requirement for a reinserted carrier and eliminates the complexity of this part of the circuit. Also the present invention uses only a single sideband yet obtains audio tones demodulated at the receiver which are within 1 Hz. of the tone information as broadcast by the transmitter. The present invention further permits a sequence of audio tone signals to be transmitted in a short period of time, for example, less than one second for each tone and with the receiver correctly de-coding this sequence of audio tones to visibly or orally emit a calling signal on any one of a plurality of transmission channels. The present invention also utilizes a rapid searching of all of the communication channels and prevents a strong signal on one channel from blocking the receiver so that it misses reception of the next searched channel.

SUMMARY OF THE INVENTION

The invention may be incorporated in a single sideband system, comprising in combination, transmitter means for generating a carrier frequency modulated by a first and a second modulation frequency to produce a carrier frequency plus two upper sideband frequencies and two lower sideband frequencies, means to at least partially suppress said carrier frequency and one of said upper and lower sideband frequencies to thus transmit the other of said upper and lower sideband frequencies containing two signals, receiver means, and a demodulator in said receiver means connected to demodulate the two signals in said other of said sideband frequencies to obtain a signal at a frequency corresponding to the difference between said two modulation frequencies.

Other objects and a fuller understanding of the invention may be had by referring to the following description and claims, taken in conjunction with the accompanying drawings.

DESCRIPTION OF THE PREFERRED EMBODIMENT

Figure 1:
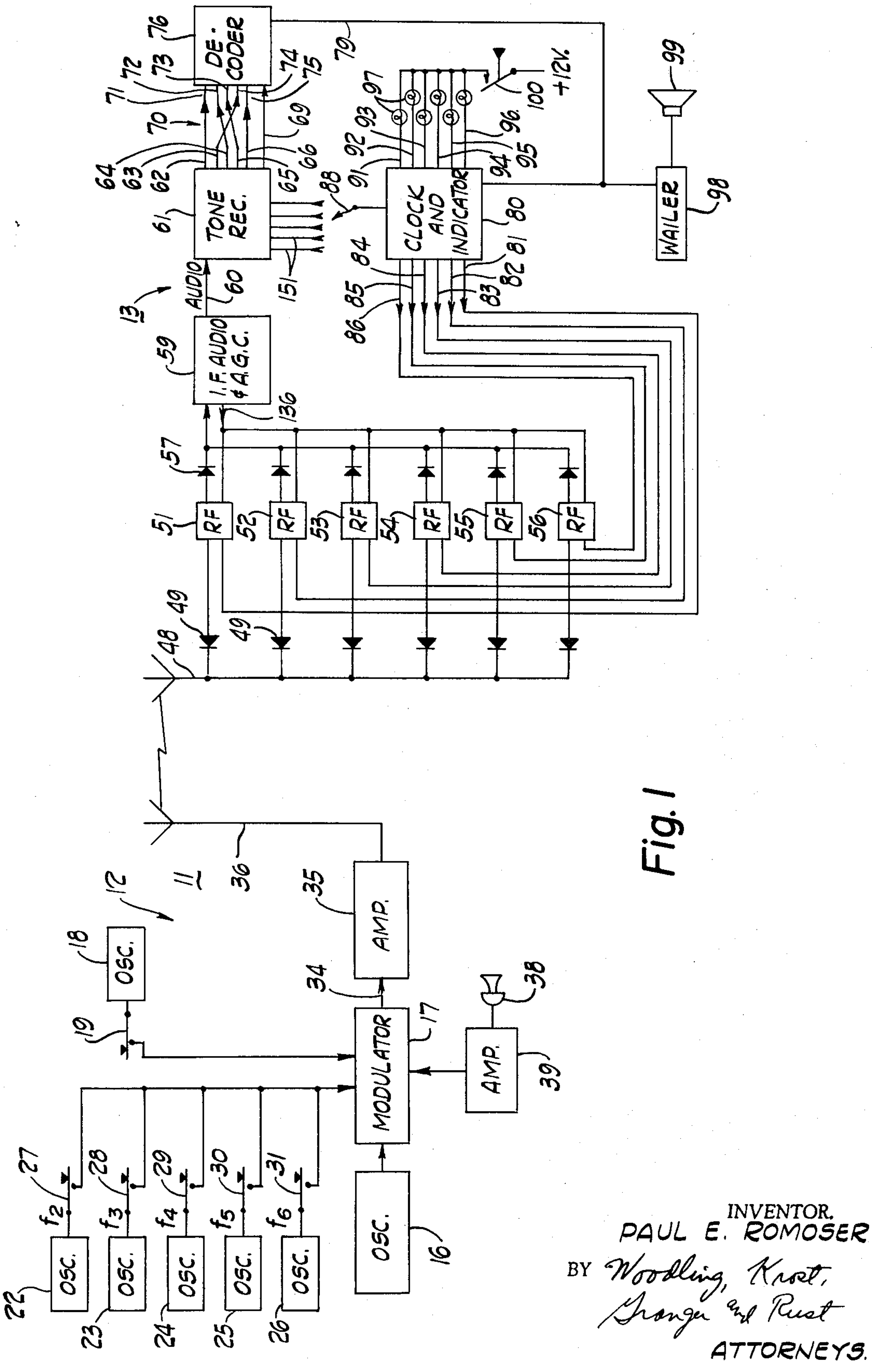
FIG. 1 is a schematic block diagram of a single sideband transmitter and receiver system incorporating the invention.

FIG. 1 shows a single sideband system 11 which includes a transmitter 12 and a receiver 13. There may be any number of transmitters, for example, there may be ten or twelve of these used as shore stations in a ship-to-shore communications system 11. Also, there may be any number of receivers 13, for example, up to several thousand receiver stations which may be located in ships for selective communication with the various shore stations. Such ship-to-shore communication system is merely one example of a use for the present single sideband selective signaling system.

The transmitter 12 may be an SSB transmitter having an oscillator 16 generating the carrier frequency, for example, 4 MHz. This frequency is supplied to a modulator 17. A first modulation frequency signal $f_1$ is supplied by an oscillator 18 to the modulator 17 to modulate the carrier frequency $f_c$. This may be supplied through a sending key 19. A plurality of additional oscillators, shown as five in number, are oscillators 22–26 to produce five different additional modulation frequencies $f_2$ through $f_6$, respectively. Sending keys 27 through 31 are associated with each of the oscillators 22–26, respectively, and when closed these keys will supply the modulation frequency to the modulator 17 so as to modulate the carrier frequency $f_c$. The sending keys are interlocked so that whenever any one of the keys 27–31 is closed, the sending key 19 will also be closed. This assures that the first modulation frequency is supplied to the modulator at the same time that one of the selected modulation frequencies $f_2$ through $f_6$ is supplied to the modulator 17. The modulated carrier is thus supplied on an output 34 of the modulator 17 to a power amplifier 35. This power amplifier will have applied to the input the carrier frequency $f_c$ plus the upper sideband and the lower sideband. The upper sideband will include, for just the modulation frequency $f_2$ along with $f_1$, for example, two signals, the first being $f_c + f_1$ and the second being $f_c + f_2$. The lower sideband will include two signals the first being $f_c - f_1$ and the second being $f_c - f_2$. Within the modulator 17, balanced modulators and filters fully suppress the carrier $f_c$ and one of the sidebands, for example, the lower sideband. Thus to the transmitting antenna 36 there is supplied only the upper sideband.

The modulated frequencies $f_1$ through $f_6$ in this preferred embodiment are chosen to be within the audio band and as one example $f_1$ may be 800 Hz and $f_2$ through $f_6$ may be 1113, 1149, 1189, 1233.7 and 1283.5 Hz, respectively. For transmitting the tone signal of $f_2$ and with a carrier frequency of $f_c$ of 4 MHz, for example, the upper sideband would then include two signals $f_c + f_1$ = 4,000,800 Hz and $f_c + f_2$ = 4,001,113 Hz.

If speech is to be transmitted, a microphone 38 is used through an amplifier 39 to supply a signal to the modulator 17 and thus modulate the carrier again producing just the upper sideband as transmitted by the antenna 36.

The receiver system 13 includes a receiving antenna 48 supplying a signal through isolating diodes 49 to a plurality of receiver head ends 51–56, respectively. These head ends are shown as six in number and may be any plurality to correspond with the number of radio-telephone carrier channels to be sequentially searched to determine if a particular communication being received on one of these channels is meant for this particular receiver system 13. The selective calling system of the present invention provides a means of decoding the calling signal which may be a particular sequence of audio tone signals as sent by the transmitter 12. In the previously discussed ship-to-shore communication system the channels may be in the 2 to 23 MHz range and there may be six such channels on any one of which a communication is to be sent to a particular receiving station. These receiver head ends may be of normal construction including RF amplifiers and super-heterodyne detection provided by a local oscillator and a mixer to establish an IF signal. Such IF output is supplied through isolating diodes 57 to an IF and audio stage 59. This stage demodulates the single sideband to achieve an audio signal on a conductor 60 supplied to tone receivers 61. There are a plurality of tone receivers equal to the number of audio tones transmitted by the transmitter 12. In this embodiment there are five such audio tones; hence five tone receivers to be selectively receptive of individual ones of the audio tones. These appear on output channels 62–66, respectively. In normal operation, five such audio tones are sent in sequence in a period of perhaps 3 to 4 seconds by the keying of the sending keys 19 and 27–31 in the transmitter station 12. As each audio tone is received and recognized by the tone receiver 61, a pulse is transmitted along a digit count conductor 69. FIG. 1 illustrates a code set connection 70 which is an interconnection between the audio output channels 62–66 and input channels 71–75 to a decoder 76. For convenience, the five audio codes are given code designations of 2, 3, 4, 5 and 6. For example, suppose a particular code of sequence of audio tones is 24536, then output channel 62 is strapped to input 71, output channel 64 is strapped to input channel 72, output channel 65 is strapped to input channel 73, output channel 63 is strapped to input channel 74 and output channel 66 is strapped to input channel 75. These code set interconnections 70 may be made in any desired sequence and even may utilize the same tone frequency two or even three times, so long as there is one other tone inbetween.

The decoder 76 decodes the sequence of tone signals and determines if the code is of proper sequence and of proper timing between tone signals. If it is not, then no signal appears on an output channel 79. If the sequence and timing is correct, then a signal does appear on the output channel 79 which is supplied to the clock and indicator circuit 80. This clock and indicator circuit has been supplying signals to sequentially enable the receiver head ends 51–56 by means of operating voltages applied thereto by conductors 81–86, respectively. The clock and indicator circuit 80 has another input on a conductor 88 which stops the clock and indicator circuit 80 upon the incidence of the first tone being received by any one of the tone receivers in the tone receiver circuit 61. By this means the automatic searching is ended whenever the beginning of a tone sequence is received on any one of the six channels from the head ends 51–56. The clock and indicator circuit 80 also has outputs 91–96 to indicator lamps 97 which indicate the channel on which the correct sequence of audio tones has been received, as indicated by a signal along conductor 79. Also the signal on conductor 79 may operate an audible indication such as a wailer 98 to operate a loud speaker 99 for both visual indication at lamps 97 and at audible indication. This will indicate at a selected one of perhaps 100 different receiver stations that there is an incoming call for it on one of the plurality of radio-telephone channels. The indicator lamps 97 may be reset by a reset switch 100, or by individual reset and lamp test switches, to be ready for the next sequence of audio tone signals indicating another call on another channel. Up to 6 incoming calls may be indicated if the calls are received on separate channels.

In the preceding example, the audio tones $f_2 - f_6$ ranged from 1113 Hz. to 1283.5 Hz. The IF and audio circuit 59 of FIG. 1, and shown in more detail in FIG. 2, demodulates these audio tones by the interaction between such tone and that signal sent from the first modulation oscillator $f_1$. As an example, the upper sideband is that which may be transmitted and with a carrier of 4 MHz these are two signals of 4,000,800 Hz and 4,001,113 Hz, considering for the moment only the signal from oscillator $f_2$. In this IF and audio stage 59 these two signals interact and produce a single audio tone of 313 Hz available on the output channel 60. To accomplish this the input to this stage 59 is on an input channel 110 and this will be an IF signal, for example, 455 KHz. This has been achieved by the superheterodyne circuit in the head ends 51–56. This incoming IF signal is applied to an IF amplifier 111 and is passed through bandpass filters, for example, highly selective ceramic filters 112 and 113 with an intermediate amplifier stage 114. These filters may have a bandpass of 4 KHz, for example, for high selectivity and supply a signal to an IF amplifier and demodulator 116. This may be a commercially available integrated circuit, for example, National Semiconductor LM 272. This circuit has an internal AGC and produces a demodulated audio output on an output channel 118. During this demodulation there is interaction between the two signals which are a part of this upper sideband. Due to superheterodyning, with a local oscillator frequency in the receiver head ends which is higher than the carrier frequency, this becomes a lower sideband on the IF signal. Thus for the above example, this will be two signals one of 454,200 and the one of 453,887. The demodulation of these two intermixed signals produces an audio output tone of 313 Hz on output channel 118. Likewise, if the transmitter is transmitting the tones $f_3$ and $f_1$ from oscillators 23 and 18, respectively, then the audio output on channel 118 is $f_3 - f_1$ or $1149 - 800 = 349$ Hz. Similarly the fourth, fifth and sixth audio tones will be 389, 433.7 and 483.5 Hz, respectively.

The audio frequency on channel 118 is passed through a high pass filter 119 passing frequencies in excess of 200 Hz, for example. This audio tone of between 313 Hz and 483.5 Hz is then supplied to an amplifier 120 and passed through a double Zener diode clipper 121 to clip the amplitude of any strong signals which inadvertently might be passed to this circuit. This audio signal is next sent through a low-pass filter 122 passing frequencies below 1,000 Hz, for example. This audio output is thus supplied to the output channel 60.

Audio output channel 118 of the IF amplifier and demodulator 116 also contains a positive AGC signal. This may be small in the order of 1.7 volts positive DC when idling on weak signals. It may increase to a maximum of about 2.5 volts positive DC on strong signals. This AGC signal is passed on a conductor 128 to an AGC circuit 129. Such circuit includes a high gain DC amplifier 130 which is normally cut off by the bias supplied on the emitter by voltage divider resistors 131 and 132. As this positive AGC signal on conductor 128 increases, amplifier 130 is no longer cut off and passes an increasing amount of current so that the collector becomes increasingly closer to ground potential. This increase turns on the uni-junction transistor 134 operating as an oscillator. It is turned on by the voltage increasing across this transistor 134 and therefore the amplitude of the oscillator output increases. Rectifiers 135 act in a voltage doubler circuit to produce a negative AGC voltage at an output terminal 136, filtered by capacitor 137. This negative AGC voltage is utilized in the receiver head ends 51–56 to control the gain of each of them. As stated above these receivers are made operable only in sequence by application of the operating voltage thereto on conductors 81–86.

Figure 3:
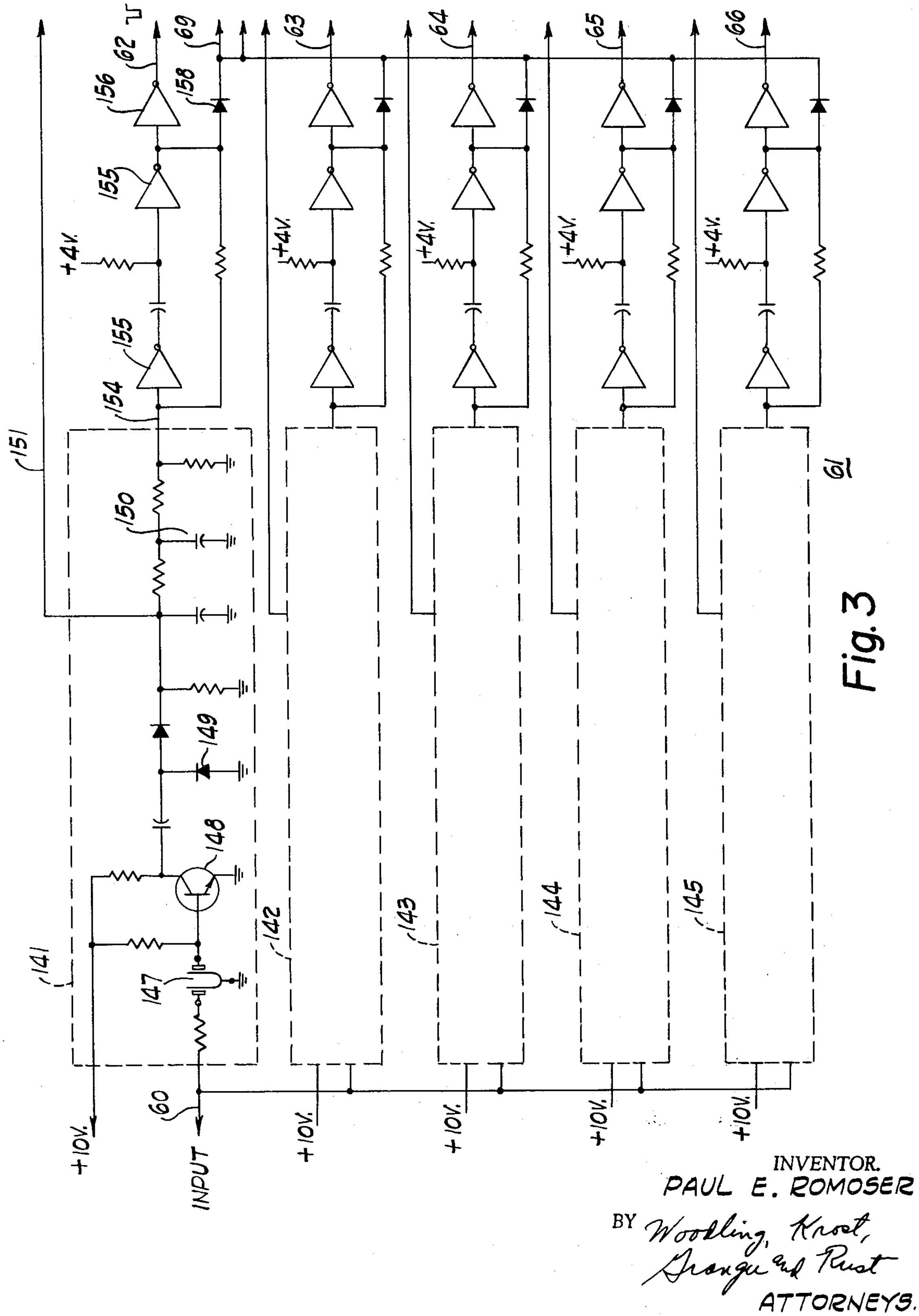
FIG. 3 is a schematic diagram of the tone receivers in the receiver system.

FIG. 3 shows more details of the tone receiver circuit 61. A plurality of tone receivers 141 through 145 are shown in this tone receiver circuit 61 with each being identical and only the circuit 141 being shown in detail. All of the inputs to these tone receivers 141–145 are connected in parallel so that each receives the signal on the input channel 60. This input is fed through a selective filter 147 which may be a reed filter each tuned to the five frequencies of interest. Such reed filters are commercially available having a selectivity of about plus or minus 1 Hz and in the above described embodiment each would be tuned to a different one of the audio tones 313, 349, 389, 433.7 and 483.5 Hz. This filtered signal is supplied to an amplifier 148, rectified by rectifiers 149 and filtered by a filter 150 to produce a DC signal on a hold output channel 151. Any one of these hold output channels may be connected to the input conductor 88 of the clock and indicator circuit 80 as described below. The rectified and filtered output from filter 150 is also supplied on a channel 154 to a monostable flip-flop 155 and then to an inverter 156 having an output on channel 62. The other tone receivers 142–145 have output channels 63–66, respectively. The action of the monostable flip-flop 155 and inverter 156 is to produce a logic 1 output as a normal condition and when the correct audio tone is received, the output channel 62 has a negative going pulse which changes from a logic 1 to a logic 0 condition for a short time, for example, 120 milliseconds, the time constant of the monostable flip-flop 155.

The monostable flip-flop 155 also has an output through an isolating diode 158 to the digit count conductor or channel 69. All of the tone receivers 141–145 have an output to such digit count channel.

Figure 4:
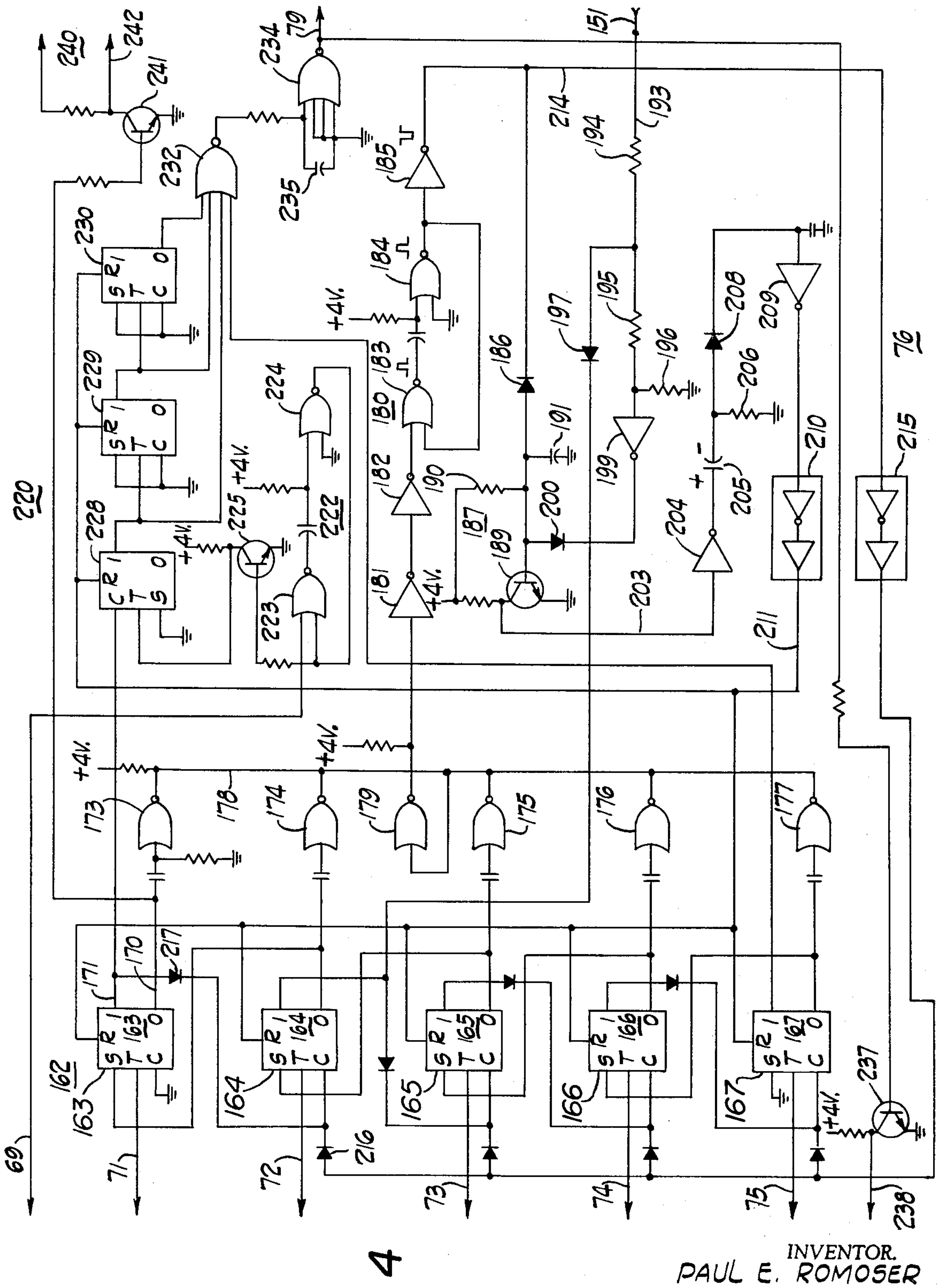
FIG. 4 is a schematic diagram of the decoder in the receiver system.

FIG. 4 shows the decode circuit 76 in greater detail. As illustrated in FIG. 1, the code set interconnection 70 may provide any desired interconnection between the outputs of the tone receiver circuit 61 and the inputs of the decoders 76. In the above example a desired code was 24536. Accordingly the interconnection at the code set connection 70 provided that audio code 2 of 313 Hz. was applied to input channel 71 of the decoder 76. Further interconnections provided audio code 4, 5, 3 and 6 on the input channels 72–76, respectively. In all cases the first audio tone of the sequence of tones will be applied on the first input channel 71. All five of these input channels lead to a code count register 162. This code count register 162 includes a series of five flip-flops 163–167. These may be J, K flip-flops of normally commercially available types such as Motorola type MC890. Each such flip-flop has a set input S, a trigger input T, and a clear input C, as well as a reset input R and two outputs. One output is a logic 1 output and the other a logic 0 output, as so indicated. These are the logic outputs under normal conditions. Upon the flip-flop being triggered the outputs go to the opposite logic condition. The device does normally trigger by a change from logic 1 to logic 0 condition on the trigger input T. If a logic 1 condition is on the clear input C, then the device cannot trigger. If a logic 1 condition is supplied on the set input S, then when and if the device is triggered, it stays triggered and will not change state. Normally each time it is triggered, the two outputs change their logic condition. Whenever the reset input R is supplied with a logic 1 condition, then the device is reset to its initial state. Each such flip-flop 163–167 has a first output 171, normally at a logic 1 condition, and a second output 170, normally at a logic 0 condition. Each of the second outputs of the flip-flops 163–167 is applied to one of a series of inverting gates 173–177. The output of each of these inverting gates is tied to a common conductor 178, is then fed through a buffer amplifier 179 to a timing circuit 180 which includes amplifiers 181, 182 and a monostable multi-vibrator including gates 183 and 184. The signal from the monostable multi-vibrator is fed through an inverting amplifier 185 and through a diode 186 to a timing circuit 187. This timing circuit includes an amplifier 189 and an RC timing circuit including a resistor 190 and a capacitor 191.

The timing circuit is also controlled by the selected one of the hold output channels 151 as shown on FIG. 3. This hold output channel 151 is connected through a voltage divider including resistors 194, 195 and 196 and from the junction of resistors 194, 195 a protection diode 197 is connected to the first output of the second flip-flop 164. The signal on the hold output channel 151 is applied through an inverting amplifier 199 and through a diode 200 to the base of the amplifier 189. This connection also controls the timing circuit 187 as described below. The signal from this timing circuit controls the reset of all registers by means of a conductor 203 connected to the collector of the amplifier 189 which conductor 203 leads through an inverting amplifier 204 to charge a capacitor 205 through a resistor 206. The voltage across the resistor 206 is applied by means of a diode 208 to an inverting amplifier 209 and an inverting buffer amplifier 210 to a reset line 211. This reset line is connected to all of the reset terminals R on the flip-flops 163–167 to reset such flip-flops whenever a logic 1 condition occurs on this reset line 211.

A protection circuit is provided from the monostable multi-vibrator 183–184, as supplied through the inverting amplifier 185. This protection circuit is supplied on a line 214 through an inverting buffer amplifier 215 and through isolating diodes 216 to the clear input C on each of the flip-flops 163–167. This prevents triggering of any of these flip-flops for a short time, e.g., 0.2 seconds after the triggering of any one of the flip-flops 163–167.

The decoder circuit 76 also includes a digit count register 220 which counts coded digits. The digit count conductor 69 from FIG. 3 is connected in the circuit of FIG. 4 through a monostable multi-vibrator 222 which includes a gate 223 and a gate 224. The output from the gate 224 is fed through an inverting amplifier 225 to the trigger input T of a first flip-flop 228 in a series of flip-flops which include flip-flops 229 and 230. The output from the digit count register 220 which includes the three flip-flops 228–230 is fed to a quad-input gate 232 which is a NOR gate having a logic 1 output when all four inputs are zero. Two inputs of the quad-input gate come from the first outputs of the flip-flops 228 and 229 and a third input of gate 232 comes from the second output of flip-flop 230. The fourth input to the gate 232 comes from the first input of flip-flop 167 in the code count register 162. The output from gate 232 goes through an inverting buffer gate 234 which has a time delay capacitor 235 connected on the input. The output from buffer gate 234 is the output channel 79 which controls the wailer 98 and loud speaker 99. It also supplies a signal to an amplifier 237 which has an output on the line 238 leading to the clock and indicator circuit 80 as described below.

The decoder 76 of FIG. 4 also includes a search stop circuit 240. This circuit includes an amplifier 241 having an input from the second output 170 of the first flip-flop 163. The collector of this amplifier 241 supplies an output signal on an output conductor 242 which is a search stop line and this signal is also supplied to the clock and indicator circuit 80 as described below.

Figure 5:
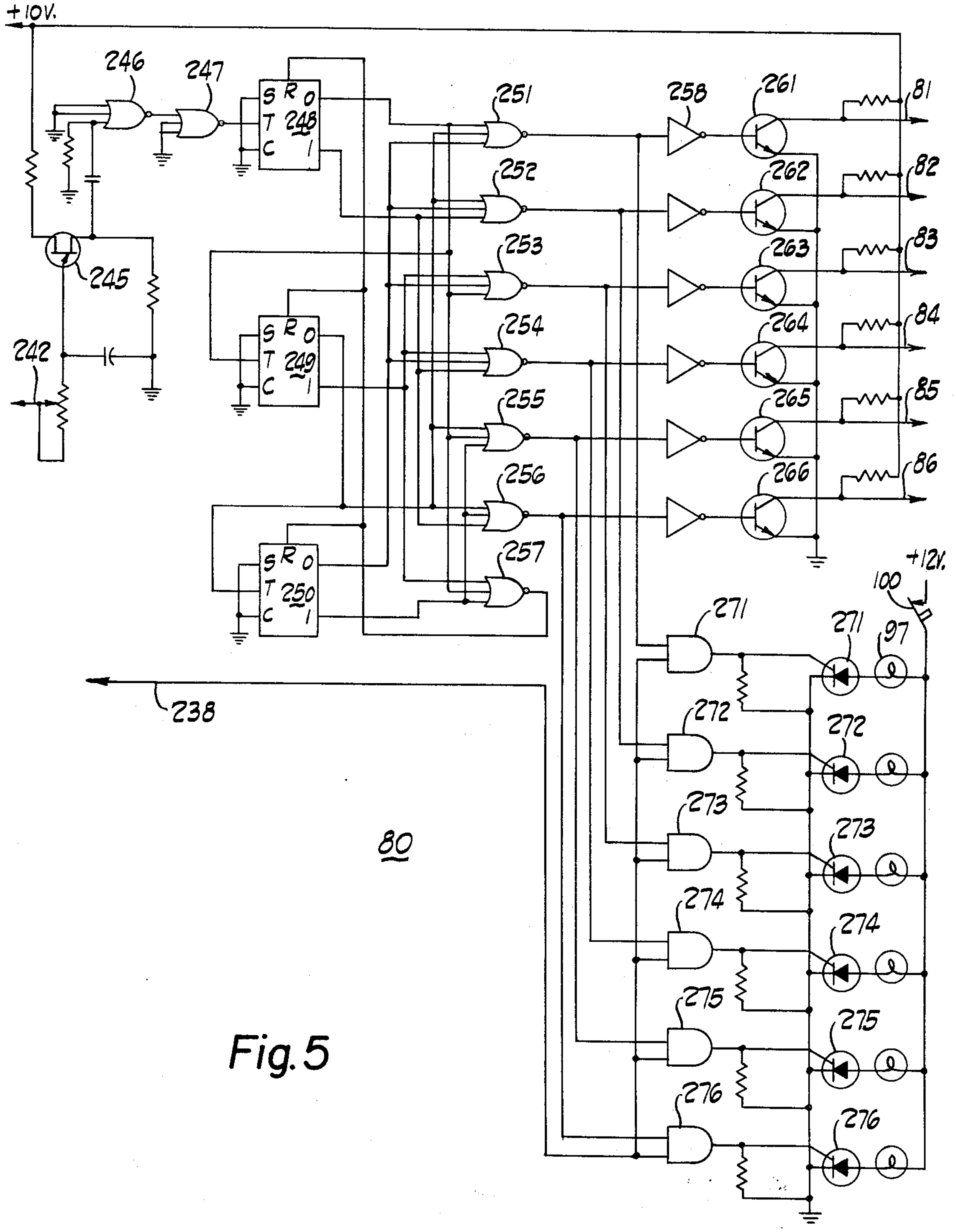
FIG. 5 is a schematic diagram of the clock and indicator circuits in the receiver.

FIG. 5 shows a schematic diagram in more detail of the clock and indicator circuit 80 as illustrated on the block diagram of FIG. 1. This clock and indicator circuit 80 develops the voltages which turn the receiver head ends 51–56 on and off in sequence and indicates on which channel the decoder call is received. The receiver head ends 51–56 are turned on in sequence by having an operating voltage applied thereto on operating voltage conductors 81–86. To obtain these operating voltages the clock and indicator circuit 80 includes a clock pulse oscillator 245 shown as a unijunction transistor. This develops pulses at a frequency of about 10 per second which are applied to pulse shaping gates 246 and 247 and applied to three flip-flops 248, 249 and 250 which constitute a register. The outputs of the register turn on in sequence gates 251–257. As each three input gates 251–256 are turned on, its output is amplified through an inverter amplifier such as amplifier 258 and this turns off transistors 261–266 in sequence. As each transistor is turned off operative voltage such as 10 volts DC is fed to the proper receiver on the operating voltage conductors 81–86, respectively. The outputs of the three input gates 251–256 are also fed to dual input gates 271–276. These are AND gates which are turned on by combination of a logic 1 signal on both inputs, one coming from the output of the three input gates 251–256 and the other input coming from the decode signal on line 238 of the decoder circuit 76. When a tone is received which is the first tone in the code for a particular receiver station, a ground is applied to the emitter of the unijunction transistor 245 from the search stop line 242, which stops the time impulses causing the search to stop on the receiver which is receiving that tone. If the code is correct, the combination of the output from that particular three input gate 251–256 and the decode voltage will turn on the proper lamp driver thyristor 271–276. This illuminates the proper lamp 97 and indicates the channel on which the signal is being received. The thyristors 271–276 will stay on indefinitely and are reset by opening the reset switch 100, FIG. 1, which removes the power supply voltage from the lamp and the thyristor.

OPERATION

The single sideband system 11 is used to register a call at a particular receiver station, perhaps one of a hundred, from a particular transmitter station, perhaps one of a dozen, using a single sideband signal. The call may be received on any one of six different channel frequencies and five different audio tones are used in sequence as the calling signal. As one example, the system 11 may be used in ship-to-shore communication where any one of a plurality of shore stations may call any one of a number of ships, all sharing the six available channels for example, in the 2 to 10 MHz. range. At the transmitter the calling code is generated and it consists of five tones in sequence sent in about four seconds. The encoding is completely manual and requires no automatic encoding circuits. The transmitter operator merely presses the proper sending keys 27–31 in sequence with interconnections to at the same time depress the sending key 19. In the above example the five tones used to make up the codes are 313 Hz, 349 Hz, 389Hz, 433.7 Hz, and 483.5 Hz. A feature of this invention is to increase each of these audio frequencies by a factor of 800 Hz and thus the second through sixth code tones which actually modulate the carrier frequency are 1113, 1149, 1189, 1233.7 and 1283.5 Hz. These are transmitted as modulated signals along with the first modulation frequency of 800 Hz. One reason for combining these frequencies with the 800 Hz first modulation frequency is to give a response at the receiver station which is much more accurate than a reinserted carrier. For convenience the lowest tone is No. 2 and the highest tone is No. 6 and thus a typical code might be 24536. One sideband such as the lower sideband is suppressed as is the carrier which is completely suppressed. Thus only the upper sideband is transmitted and is received at the receiving antenna 48. As mentioned above, the receiver head ends 51–56 are turned on in sequence by applying operating voltages thereto on the conductors 81–86. These are turned on for a period of about one-tenth of a second each to successively sweep through the various carrier channels to determine if a sequence of calling code signals is being transmitted on any one of these six channels. Accordingly the complete search sequence for six channels is about six-tenths of a second. The series of diodes 49 and the series of diodes 57 provide isolation between the IF and antenna circuits of the active receiver from those of the five inactive receivers. The output from the selected receiver head end 51–56 is an IF signal which is supplied to the IF and audio stage 59 shown in FIG. 2. Here the signal is amplified and filtered at the IF frequency and then demodulated in the IF amplifier and demodulator 116. The output at 118 has been demodulated to be an audio frequency. For example if the tone No. 2 is being sent, then this audio frequency at the output 118 is the difference between 1113 and 800 Hz; namely, it is 313 Hz which is the desired frequency for tone No. 2. This signal is passed to the audio output channel 60 which is the input to the tone receiver circuits 61 shown in FIG. 3. As stated above, each of these tone receivers 141–145 is tuned by a reed filter 147 to a particular one of the audio tones 313 through 483.5 Hz. Such selected audio tone is amplified and then rectified to give a DC signal which appears on the hold output line 151. It is also filtered and applied through the monostable flip-flop 155 and inverted by the amplifier 156 so that as each tone is received, there is a negative going pulse on the output of inverter 156; namely, the signal changes from the logic 1 to a logic 0 condition for a short time, for example, 0.120 seconds. This is a pulsed signal on the output of the respective tone receiver whenever that particular tone is received on the input of such tone receiver 141–145.

The output on channel 62–66 of the tones 2–6, respectively, is applied to the decoder circuit 76 shown in FIG. 4. As schematically illustrated in FIG. 1, the code set connection 70 may be set for any desired code and in the above example, such code has been set as 24536. Such interconnections are shown in FIG. 1. Accordingly in the decoder circuit 76 of FIG. 4 the interconnections assure that the various audio tones for the correct code will appear in sequence on the input channels 71–75, respectively. These input channels lead to the code count register 162 which consists of the five flip-flops 163–167. Also for each pulse received on these input channels 71–75, there is a corresponding positive going pulse appearing on the digit count channel 69 which is applied to the digit count register 220. In the code count register 162 the flip-flops are so interconnected that only the first flip-flop 163 may be triggered at the first tone in a sequence of tones. This is effected by the first output 171 of flip-flop 163 being connected through an isolating diode 217 to the clear input C of the second flip-flop 164. So long as a logic 1 condition is applied to this clear input, this flip-flop 164 cannot be triggered. There is a similar connection for all of the sequence of flip-flops 164 through 167.

Now when a negative-going pulse from logic 1 to logic 0 appears on the input channel 71, this will trigger the flip-flop 163 into the opposite state. Accordingly the first output 171 goes to logic 0 and the second output 170 goes to logic 1. This logic 1 condition is passed through the inverting gate 173 and the buffer amplifier 179 to the timing circuit 180 which includes the monostable vibrator 183, 184. This change to a logic 1 condition on the second output 170 of flip-flop 163 is inverted to be changed to logic 0 condition at the output of gate 173 and again inverted to be a change to logic 1 condition at the output of buffer amplifier 179. It is inverted twice by the amplifiers 181 and 182 and again inverted twice by the monostable vibrator 183, 184 to again be a change to a logic 1 condition on the output of gate 184. Thus being inverted again at the amplifier 185 the output changes from a logic 1 to a logic 0 condition for a short time period, for example, 200 milliseconds. This pulse is applied to all of the code count register flip-flops 163–167 to disable them for this 200 millisecond period. This is effected by this pulse being applied through the buffer amplifier 215 and through the isolating diodes such as diode 216 to the clear output C. This prevents noise pulses from passing through the registers and giving a decode output.

The 200 millisecond negative going pulse is also applied to the timing circuit 187. The time constant of this circuit is approximately 1 ½ seconds and the output of the transistor 189 causes a reset pulse to be applied to all registers through the buffer amplifier 210. On the first digit of the sequential digit code a hold is applied to the base of transistor 189 through the inverter amplifier 199 so that on the first digit of the code the timing circuit 180, although it fires, cannot deliver a reset pulse to the registers. The means for doing this is the signal coming in to the hold input line 193 on the hold output channel 151 coming from the tone receiver circuit 61 of FIG. 3. Accordingly, however, the code set connection 70 is made, whichever tone 2–6 is to be the first tone of the code, that particular tone hold output channel 151 is that which is connected to the hold input line 193. Thus on this first digit of the code a hold is applied on this hold input line 193. Normally this line has a logic 1 condition thereon and goes to a logic 0 whenever this first digit of the code appears. During the time that there is a normal logic 1 condition, this is passed through the amplifier 199 and inverted to become a logic 0 codition. This forward biases the diode 200, thus maintaining the base of transistor 189 at ground potential and preventing the capacitor 191 from charging. This is how the hold prevents this timing circuit 187 from acting to deliver a reset pulse to the registers 162 and 220.

In the code count register it has been shown that only the first flip-flop 163 may be triggered upon presence of a tone signal. After this flip-flop 163 is triggered, the output 171 goes to logic 0 and the second output 170 goes to logic 1. This logic 0 condition on output 171 is now applied to the clear input C on the second flip-flop 164. Thus this flip-flop is now enabled and when the second signal on channel 72 of the proper code sequence is applied to the trigger input T, this flip-flop 164 will be triggered. Accordingly, if the proper code sequence is applied to the inputs 71–75, the flip-flops 163–167 will all be triggered in sequence thus arriving at a condition where the second output 170 of the flip-flop 167 will change from a logic 0 condition to a logic 1 condition.

It is possible to connect two such flip-flop trigger input T's in parallel so long as there is another flip-flop in between. Thus the code could be 23232 for example, and this would mean that the inputs 71, 73 and 75 were paralleled and inputs 72 and 74 were paralleled. This would provide sequential triggering of the flip-flops 163–167, respectively.

Upon the first tone of the code sequence being applied to the input 71, the flip-flop 163 would be triggered to the opposite logic output condition. This enables the digit count register 220 because the first output 171 goes from logic 1 to logic 0 condition and this places a logic 0 condition on the clear input C of the first flip-flop 228 in the digit count register 220. Thus the five pulses coming along the digit count conductor 69 may now be counted in the digit count register 220. This register determines if there are a total of five digits and if the timing thereof is proper, that is if the pulses are not too close together nor are they spaced too far apart in time. These pulses are all positive going pulses, that is, changing from logic 0 to logic 1. The first pulse is applied to the monostable multivibrator 222 by being applied to one of the two inputs of the dual input OR gate 223. The output of gate 223 goes to logic 0 and the output of dual input gate 224 goes from logic 0 to logic 1. This condition is applied to the other input of the OR gate 223 to flip it back to its monostable condition and is also applied to the inverter amplifier 225 so that the output of this amplifier goes from logic 1 to logic 0 and this is applied to the trigger input T of the first flip-flop 228. Table 1 below shows the sequence of conditions for the outputs of the various flip-flops 228, 229, 230, flip-flop 167 and the quad input gate 232. This Table 1 shows a normal condition with the first outputs of the flip-flops 228 and 229 being at logic 1 and the second output of flip-flop 230 being at logic 0.

TABLE 1

| Pulse | 228 out | 229 out | 230 out | 167 out | 232 out |
|---|---|---|---|---|---|
| Normal | 1 | 1 | 0 | 1 | 0 |
| 1 | 0 | 0 | 1 | 1 | 0 |
| 2 | 1 | 0 | 1 | 1 | 0 |
| 3 | 0 | 1 | 1 | 1 | 0 |
| 4 | 1 | 1 | 1 | 1 | 0 |
| 5 | 0 | 0 | 0 | 0 | 1 |

Also, the first output 171 of the fifth flip-flop 167 in the code count register 162 is at logic 1 condition and only changes to logic 0 upon the proper sequence of all five codes. This logic 1 normal condition of the output of flip-flop 167 is also shown in Table 1. The quad input gate 232 is a NOR gate and goes to a logic 1 output only when all four inputs are 0.

Accordingly, when the first digit is counted in the digit count register 220, the flip-flop 228 is triggered to the opposite output logic condition. Due to the interconnection to the trigger input of the second flip-flop 229, this one also changes to the opposite logic output condition. Due to the interconnection to the third flip-flop 230, this triggers the input T on flip-flop 230 to change it from logic 0 to logic 1 condition. On the counting of the second digit another pulse from logic 1 to logic 0 is applied to the tripper input T of the first flip-flop 228. This changes its logic output to logic 1, but makes no other changes because a change from a logic 0 to a logic 1 condition on the trigger input T has no effect on a flip-flop, such as flip-flop 229. Now for the third digit being counted, this again triggers flip-flops 228 and 229 to logic 0 and logic 1 output conditions, respectively, but no change is made to flip-flop 230. With fourth digit being counted, only flip-flop 228 changes state to a logic 1 output condition and it will now be seen that all four inputs to the quad input gate 232 are at a logic 1 condition. Now with the fifth digit being counted, this triggers all flip-flops 228, 229 and 230 changing their state so that the outputs thereof are all changing to a logic 0 condition. Also with this fifth digit being counted, if this fifth digit is the proper tone, the fifth flip-flop 167 in the code count register 162 will be triggered to the opposite logic condition and this will place another logic 0 input condition on the fourth input of the quad input gate 232. Accordingly, it changes state to a logic 1 output. This is used to actuate the wailer 98 and loudspeaker 99 and the indicator lamps 97 to indicate the channel on which the channel is being received.

When the first flip-flop 163 in the code count register is set, it also operates the search stop circuit 240 which stops the search clock in the clock and indicator circuit 80 and thus operating voltage of 10 volts positive is applied continuously to the receiver on which the signal is being received.

The second tone pulse of the proper code sequence sets the second flip-flop 164 if the first flip-flop 163 has been set and a 200 millisecond period has elapsed since the initiation of the first tone. This 200 millisecond period is caused by the output from the timing circuit 180 which is applied through the buffer amplifier 215 and through the diodes 216 to the clear input C of each of the flip-flops 164 through 167. Because the first tone has now stopped, the hold voltage on the transistor 189 has been removed and if the second tone does not follow within 1 ½ seconds, the time period of the timing circuit 187, amplifier 189 will cause all registers to reset through the buffer amplifier 210. This puts a logic 1 condition on the reset line 211 to reset all the flip-flops in the code count register 162 and it is also connected to reset all of the flip-flops in the digit count register 220. The second tone also pulses the digit count register 220 stepping it up one more count. This process is repeated, assuming a correct code, until the digit count register has counted five digits and the code count register has set the last flip-flop 167. When this condition exists the quad input gate 232 will change to a logic 1 condition as set forth above and will deliver a decode signal through the buffer amplifier 234 and amplifier 237. The reset circuits are still active and both registers 162 and 220 will be reset after 1 ½ seconds. The decoder circuits are then prepared for another coded signal.

It will be seen from the foregoing explanation that a single sideband system is achieved for a selective calling of any one of a plurality of receiver stations. Different audio tones are transmitted in sequence and are received on a single sideband system with a fully suppressed carrier. This reception and demodulation is accomplished without any reinserted carrier and hence without the drifting of perhaps 10 to 20 Hz which could easily be the case with a reinserted carrier. If such a reinserted carrier system were attempted to be used for demodulation and drifted only 10 or 20 Hz in reinserted oscillator carrier frequency, this could completely destroy and make inoperative this particular code sequence. The reed filters 147 in the tone receiver circuit 61 are selective within plus or minus 1 Hz and hence this drift of 10 to 20 Hz would prevent such signals from being passed by the reed filters. Also the five audio tones 313 through 483.5 are all contained within an audio frequency band of less than 180 Hz and it would not be possible to have this narrow an audio band if a reinserted carrier system were used. The system is not limited, however, to a 180 Hz bandwidth. Many more tones may be used to derive more codes or private calling systems.

Figure 2:
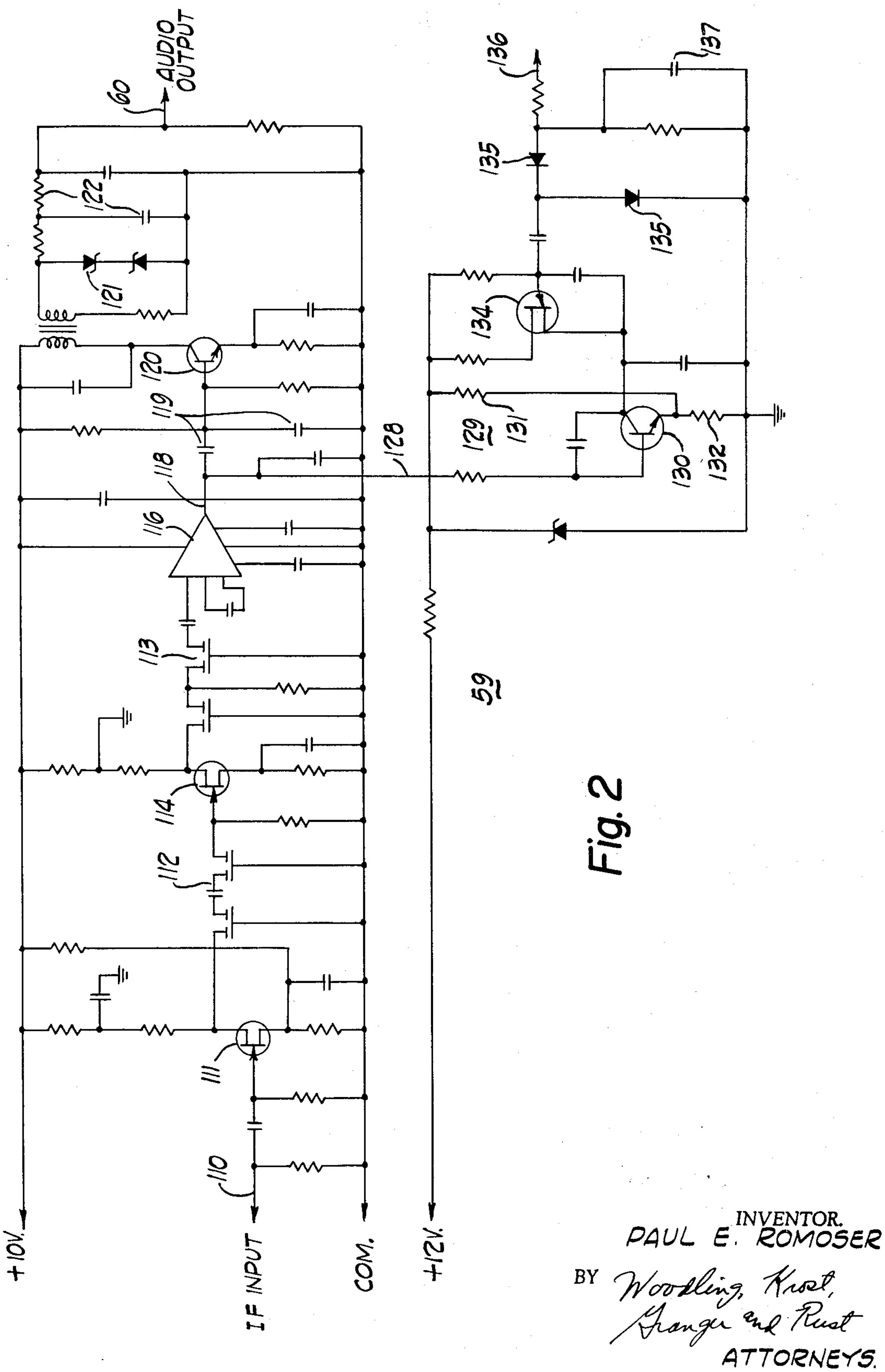
FIG. 2 is a schematic diagram of the IF and audio stages of the receiver.

The IF and audio stage 59 as shown in FIG. 2 develops a negative AGC voltage which is utilized in the receiver head ends 51–56 to control the gain thereof and this is a very rapid AGC not like the normal ones which have perhaps two-tenths of a second up to five-tenths of a second time delay. A 2/10 to 5/10 second time constant would not be feasible in this sequential searching through six different carrier channels, in a period of only one-tenth second for each receiver. The reason for this is that if a strong signal were received on one particular receiver having a normal AGC time constant of two-tenths to five-tenths of a second, this could completely block the receiver so that it would not effectively receive the next channel in the search sequence. With the present AGC system having a negative AGC voltage which rapidly follows the strength of the incoming signal, that is, in the order of 10 to 20 milliseconds, this difficulty is completely overcome.

With this sequence of five tones in the code, it is possible to have a total of five times four times four times four times four or a total of 1,400 different codes. Thus it is possible to have this many receiver stations in the system each with a different code. Using nine tones and assigning the tones numbers 1 through 9, over 36,000 codes are available.

It will be noted that the present selective calling system of a single sideband may be used whether the carrier is present, whether it is merely a vestigial carrier or whether it is fully suppressed. However, the lack of requirement of any carrier whatever permits this system to be used with a fully suppressed carrier. The present system, it will be noted, has the first modulation frequency at a constant frequency and the second modulation frequency may be considered as one which varies, maintaining constant for a certain period of time, for example, 1 second and then changing to another frequency so that the given audio code sequence of signals may be transmitted. Additionally it will be noted that the first modulation frequency is less than the second modulation frequency, or the second through sixth modulation frequencies, however, the reverse may be true; namely, that the first modulation frequency may be higher than any of the second through sixth modulation frequencies. In such case the frequencies of the resulting audio one signals in the receiver are inverted from that in the sequence of second through sixth modulation frequencies in the transmitter. By this single sideband system intelligence is transmitted from the transmitter to the receiver and this intelligence is used as a code for a particular calling sequence to call a particular receiver station. If the code chosen happened to be one of a continuously ascending scale of frequencies or a continuously descending scale of frequencies, then the second through sixth frequencies as applied to the modulator 17 of the transmitter need not be discrete frequencies each at a constant value, instead they could be a continuously variable tone which ascended or descended in pitch and passed through each of the five selected frequencies of the oscillators 22 through 26. This shows that the intelligence being transmitted need not be restricted to individual tones, in fact, it could be a modulation signal of a particular band width. It will be noted that the modulation frequencies are transmitted in pairs with these pairs of modulation frequencies being in sequence, and the decoder decodes this demodulated sequence of different frequencies.

It will be noted that the reset means is responsive to either too short or too long a time between consecutive digits. The timing circuit 180 lasts for about 200 milliseconds and this applies a logic 1 on the clear input C of the flip-flops 164 through 167. Thus if a tone signal is received too quickly after the preceding pulse, that is, within this 200 millisecond period, then the next successive flip-flop cannot be set. Likewise if the timing between successive code signals is too long, the signal will not be decoded because all the registers will have been reset. The timing circuit 187 is about 1 ½ seconds and if the next code in the sequence is not received during this 1 ½ seconds then a reset signal is delivered to reset all of the flip-flops in the registers 162 and 220.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A single sideband system, comprising in combination, transmitter means for generating a carrier frequency modulated by a first and a second modulation frequency to produce a carrier frequency plus upper and lower sidebands with two upper sideband frequencies and two lower sideband frequencies, means to at least partially suppress said carrier frequency and one of said sidebands, means for transmitting the other of said sidebands containing two sideband frequency signals with one being said first modulation frequency and the other being a sequence of different modulation frequencies as said second modulation frequency, receiver means, a demodulator in said receiver means connected to demodulate the two signals in said other of said sidebands to obtain a signal at a frequency corresponding to the difference between said first and second modulation frequencies, said demodulator obtaining a sequence of signals at frequencies corresponding to the difference between said first and second modulation frequencies, decoder means to decode the difference frequencies in such sequence, and a register in said decoder means to count the number of digits represented by the modulation frequencies received to determine if the proper number of digits is received.

2. A system as set forth in claim 1, including means in said transmitter means for transmitting in sequence at least three code signals of different frequencies as said second modulation frequency.

3. A system as set forth in claim 1, including search means in said receiver means to sequentially search said plurality of carrier channels to determine if a signal is being transmitted thereon.

4. A system as set forth in claim 3, including means in said receiver means to stop the search upon reception of a signal on a particular carrier channel.

5. A system as set forth in claim 1, wherein said carrier is fully suppressed.

6. A system as set forth in claim 1, wherein said one of said sidebands is fully suppressed.

7. A system as set forth in claim 1, wherein one of said first and second modulation frequencies is substantially constant for a period of time.

8. A system as set forth in claim 1, wherein each of said first and second modulation frequencies is substantially constant for a period of time.

9. A system as set forth in claim 1, wherein said first modulation frequency is less than said second modulation frequency.

10. A system as set forth in claim 1, including an AGC circuit developing a negative voltage to control the gain of said receiver means.

11. A system as set forth in claim 1, wherein said decoder means includes flip-flops responsive to each of said modulation frequencies to be set in sequence and determine the proper sequence of code signals.

12. A system as set forth in claim 11, including means in said decoder means responsive to such proper sequence to provide an indication of a calling signal being received on a selected carrier channel.

13. A system as set forth in claim 1, including means to reset said register if the time between successive digits is too short.

14. As system as set forth in claim 1, including means to reset said register if the time between successive digits is too long.

15. A system as set forth in claim 1, including means in said circuit developing an AGC positive voltage, and means utilizing said AGC positive voltage to develop a negative AGC voltage.

16. A system as set forth in claim 1, including an oscillator, means to increase the voltage output of said oscillator in accordance with the strength of the received signal, AND MEANS DEVELOPING AN AGC voltage in accordance with the output of said oscillator.

17. A system as set forth in claim 16, including rectifier means connected to said oscillator to develop a negative AGC voltage in accordance with the strength of the received signal.

* * * * *